United States Patent [19]
Wiedeman et al.

[11] Patent Number: 6,064,857
[45] Date of Patent: May 16, 2000

[54] DUAL MODE SATELLITE TELEPHONE WITH HYBRID BATTERY/CAPACITOR POWER SUPPLY

[75] Inventors: Robert A Wiedeman, Los Altos; Jamal Izadian; Vijaya Gallagher, both of San Jose, all of Calif.

[73] Assignee: Globalstar L.P., San Jose, Calif.

[21] Appl. No.: 08/834,239

[22] Filed: Apr. 15, 1997

[51] Int. Cl.$^7$ ...................................................... H04B 1/04
[52] U.S. Cl. .......................... 455/12.1; 455/127; 455/572
[58] Field of Search .................................. 455/127, 572, 455/573, 574, 126, 93, 552, 553, 343, 10, 12.1, 13.1, 13.4, 63; 330/297; 307/110; 375/216

[56] References Cited

U.S. PATENT DOCUMENTS

| | | | |
|---|---|---|---|
| Re. 32,905 | 4/1989 | Baran | 370/104 |
| 4,901,307 | 2/1990 | Gilhousen et al. | 370/18 |
| 5,010,317 | 4/1991 | Schwendeman et al. | 340/311.1 |

(List continued on next page.)

FOREIGN PATENT DOCUMENTS

| | | |
|---|---|---|
| 0 421 698 A2 | 10/1991 | European Pat. Off. . |
| WO 90/13186 | 11/1990 | WIPO . |
| WO 91/09473 | 6/1991 | WIPO . |
| WO 93/09613 | 5/1993 | WIPO . |
| WO 97/48165 | 12/1997 | WIPO . |

OTHER PUBLICATIONS

Petition of American Mobile Satellite Corporation Before the FCC, Washington, DC 20554, dated Jun. 3, 1991, pp. 1–15.
Application of Motorola Satellite Communications, Inc. for IRIDIUM A Low Earth Orbit Mobile Satellite System before the FCC, Washington, D.C. Dec. 1990, pp. 49–96.
Before the FCC, Washington, D.C. 20554, Aries Constellation Low Earth Orbit Satellite System Proposal of Constellation Communications, Inc. Jun. 3, 1991, Appendix A, B, and C.
Application of TRW Inc. for Authority to Construct a New Communications Satellite System Odyssey$^{sm}$ before the FCC, Washington, D.C. 20554, May 31, 1991 pp. 33–51.
Application of Ellipsat Corporation ELLIPSAT for the Authority to Construct Ellipso$^R$I Elliptical Orbit Satellite System, before the FCC, Washington, D.C. 20554, Nov. 2, 1990, pp. 5–34.

(List continued on next page.)

*Primary Examiner*—Reinhard J. Eisenzopf
*Assistant Examiner*—Lester G. Kincaid
*Attorney, Agent, or Firm*—Ohlandt, Greeley, Ruggerio & Perle, L.L.P.

[57] ABSTRACT

A method for operating a satellite communications terminal (10) that transmits one of digital voice or data signals during a frame period. The terminal includes a transmitter and a receiver, the transmitter including an RF power amplifier. The method includes the steps of: (a) providing the terminal with a power source including a battery, a high energy density capacitor (HEDC), and a switching circuit for selectively coupling one or both to an output of the power source, the output of the power source being coupled at least to the RF power amplifier; (b) storing predetermined threshold values, including at least a data rate threshold value and a transmitter power level threshold value; (c) comparing at least one of a transmission rate and a transmission power level to be used during a next frame period to the stored data rate and power level threshold values; and (d) responsive to the comparison, controlling the switching circuit so as to select one or both of the battery and HEDC for coupling to the output of the power source. In a preferred embodiment the step of storing includes an initial step of receiving at least one of the data rate threshold value and the transmitter power level threshold value from a satellite that is linked to a terrestrial station. The step of storing further includes an initial step of inputting at least one of a mode flag and an on/off flag from a terminal user interface, and storing the inputted flag in a memory. In this case the step of comparing is responsive to the stored flags for selecting whether to connect only the battery, or only the HEDC, or both the battery and the HEDC in parallel to the output of the power source.

10 Claims, 9 Drawing Sheets

U.S. PATENT DOCUMENTS

| | | | |
|---|---|---|---|
| 5,073,900 | 12/1991 | Mallinckrodt | 375/1 |
| 5,081,703 | 1/1992 | Lee | 455/13 |
| 5,109,390 | 4/1992 | Gihousen et al. | 375/1 |
| 5,119,225 | 6/1992 | Grant et al. | 359/172 |
| 5,180,645 | 1/1993 | More | 455/127 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,265,119 | 11/1993 | Gilhousen et al. | 375/1 |
| 5,303,286 | 4/1994 | Wiedman | 379/59 |
| 5,339,330 | 8/1994 | Mallinckrodt | 375/1 |
| 5,410,728 | 4/1995 | Bertiger et al. | 455/13.1 |
| 5,415,368 | 5/1995 | Horstein et al. | 244/158 R |
| 5,422,647 | 6/1995 | Hirsfield et al. | 342/354 |
| 5,423,078 | 6/1995 | Epperson et al. | 455/572 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |
| 5,535,432 | 7/1996 | Dent | 455/12.1 |
| 5,546,051 | 8/1996 | Koizumi et al. | 455/127 |
| 5,551,624 | 9/1996 | Horstein et al. | 244/158 R |

OTHER PUBLICATIONS

Application of Loral Cellular Systems, Corp., Globalstar Mobile COmmunications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

"Current and Future Mobile Satellite Commincation Systems", S. Kato et al., IEICE Transactions, vol. E 74, No. 8 Aug. 1991, pp. 2201–2210.

"Digital Network Oriented Mobile Radio Satellite System as an Integrated Part of The GSM Cellular Radio System in Europe", P. Dondl, Deutsch BUndespost/Fernmeldetechniches Zentralmt/Darmstadt, Sep. 21, 1989 Fed. Rep. Germ.

"The OmniTRACS$^R$ Mobile Satellite Communications and Positioning System", E. Tiedemann, Jr. et al., Vehicle Electronics in the 90's: Proceedings of the In'l. Congress on Transportation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium™1 System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

"Company Information", PolyStor, undated, 4 pages.

"Supercapacitor powers new applications", Ashok Bindra, Press Release, EE Times, Oct. 14, 1996, Issue 923, 3 pages.

Maxwell Technologies Product Information, 1996, 11 pages.

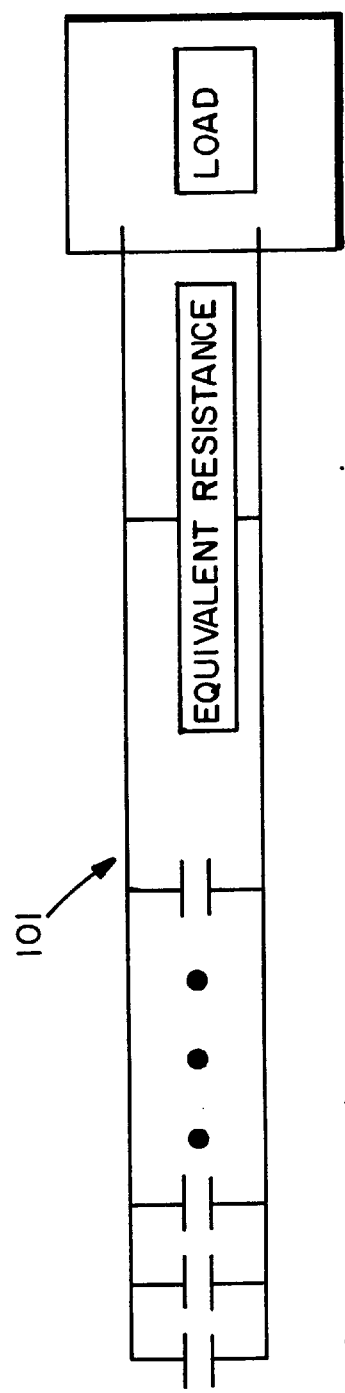
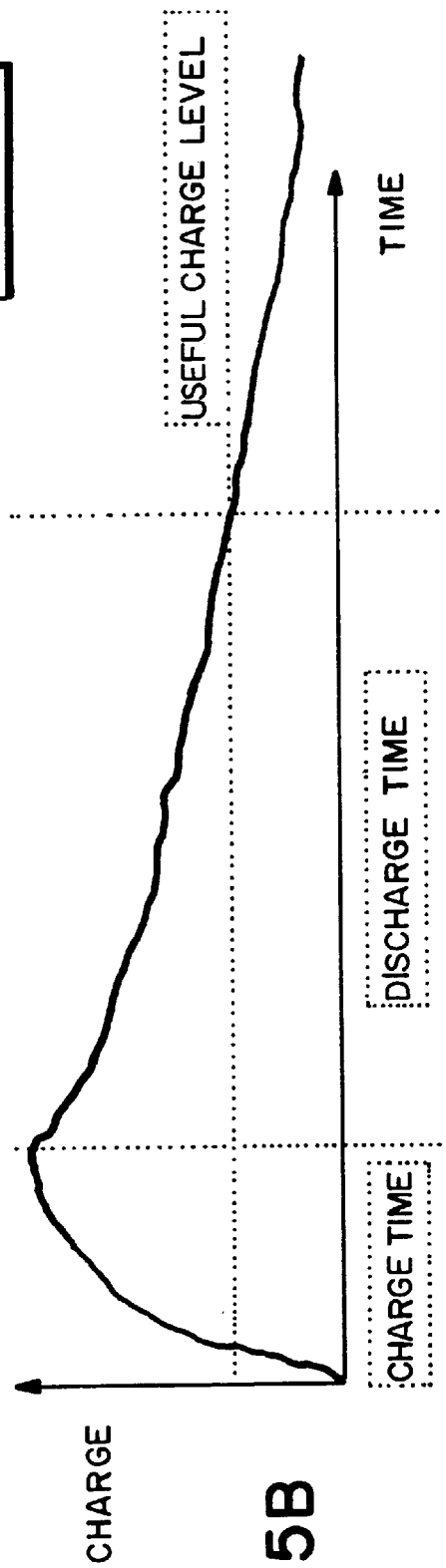
FIG. 5A
FIG. 5B

DUAL MODE SATELLITE TELEPHONE WITH HYBRID BATTERY/CAPACITOR POWER SUPPLY

FIELD OF THE INVENTION

This invention relates generally to communications devices and, in particular, to communications transceivers capable of transmitting and receiving digital communication signals with one or more satellites.

BACKGROUND OF THE INVENTION

Some mobile cellular telephones, such as TDMA and CDMA satellite telephones, battery-powered fixed unmanned telephones in remote rural areas and other communications devices operate in a digital mode. Such communications comprise, typically, long periods of time idle interspersed with shorter calling periods consisting of receiving periods and transmitting periods. The transmitting periods use either constant data rates or variable data rates, combined with variable power control to account for variable amounts of interference, a distance from repeaters or base stations, and other technical factors such as fading and blocking. The interference has two components: (a) external interference and (b) self-interference from the user's own system caused by other user terminals. The instantaneous power demand can vary as a function of distance from a satellite, a repeater, or from a base station to which the terminal is transmitting. The power demand can also fluctuate due to fading and signal blockages caused by obstructions and the general RF propagation environment of the terminal.

During a normal call it can be shown that approximately 50% of the time no transmission is made from the terminal and, in the case of a variable rate vocoder, that less than 10% of the time the terminal transmits at a peak rate (e.g., 9600 bits per second) during typical 20 millisecond frames. The remainder of the time the terminal operates at half the peak rate (e.g., 4800 bps) or lower.

The terminal transmits this variable rate, which requires more power, at times when the fading and interference is also varying. As a result, a power factor for the instantaneous data rate may be 15 dB for a system operating at a peak rate of 9600 bps, to a minimum rate of 300 bps. Even greater peak power factors may exist under some circumstances. In addition, instantaneous fades of 10 to 20 dB are not uncommon, while the interference may add an additional 10 dB. The sum of these powers indicates that the frame to frame variation in required power may range up to approximately 50 dB.

The final RF transmitter power amplifier consumes a considerable amount of battery current, which increases with the data transmission rate and when RF signal impairments, such as fast fades, are present. As such, the current drawn from terminal's battery is not constant, but will typically vary considerably during operation on a frame to frame basis. Furthermore, the typical battery does not readily provide transient power to a load as is typically required for transmitters that are required to periodically transmit at a high power level. This type of operation tends to shorten battery life and lower the available battery capacity (e.g., an 1100 A-Hr battery may yield only 800 A-Hr of capacity).

Advances in materials science have resulted in the availability of so called High Energy Density Capacitors (HEDCs). One such device is manufactured by PolyStor Corporation, and is based on a very high surface area carbon aerogel material. One device, referred to as a PolyStor A-14500, has a working voltage of 2.5 V, a capacitance at 1 A of 7 Farads, an ESR at 1 kHz of <35 milliohms, a specific power of 4,000 W/kg, a maximum discharge of 35 A, and a current life cycle in excess of $10^5$. Suggested applications for such HEDCs include hybrid power packs for digital (pulse) telecommunications applications, power conversion applications, pulse power applications such as vehicular air bag deployment, audio and electronic filtering, and as a 'turbocharger' for batteries.

In general, the use of a battery is best for slow charge and non-bursting type of transmissions, while the use of the HEDC is best for the burst power case with wide dynamic range. It is an object of this invention to provide methods and apparatus for combining and exploiting the advantages of both batteries and the HEDC-type of power source.

OBJECTS OF THE INVENTION

It is a further object of this invention to provide a user communication terminal that includes a HEDC that is switchably connected with a battery so as to selectively provide higher operating currents.

It is another object of this invention to provide a user communication terminal that includes a HEDC that is switchably connected with a battery so as to selectively provide higher operating currents as a function of a transmitted data rate.

It is another object of this invention to provide a user communication terminal that includes a HEDC that is switchably connected with a battery so as to selectively provide higher operating currents as a function of transmitter power required to obtain a desired connection quality.

It is another object of this invention to provide a user communication terminal that includes a hybrid power source including a HEDC that is switchably connected with a battery, and that provides a mechanism to controllably charge and discharge the power source.

It is one further object of this invention to provide a satellite communication terminal that includes a HEDC that is switchably connected with a battery so as to selectively provide higher operating currents under the control of an external device, such as a terrestrial gateway.

SUMMARY OF THE INVENTION

The foregoing and other problems are overcome and the objects of the invention are realized by methods and apparatus in accordance with embodiments of this invention, wherein a communications device, such as a fixed satellite communications terminal or a hand-held satellite communications user terminal (UT) or mobile communications unit, is provided with a hybrid battery/capacitor power supply. A High Energy Density Capacitor (HEDC) is combined with a rechargeable battery in an automatic switchable topology so as to operate the battery either switched in (no HEDC), switched out (HEDC only), or in parallel with the HEDC.

The automatic selection of the HEDC and/or the battery can be based on the data rate transmitted by the UT, or on a transmitter power requirement of the UT, and/or on other control events. The use of the HEDC prolongs the battery life, the time between required battery rechargings, and can extend both the talk time and the standby time of the UT.

The use of this invention can reduce the size and weight of a satellite telephone and/or extend the idle time and talk time. The use of this invention can result in fewer battery charging events while extending the time between charging events.

The use of this invention with a fixed, battery powered terminal that is recharged using solar cells, or some other power source, can also benefit from the teachings of this invention, as the battery life can be prolonged and the reliability of the recharging mechanism can be increased.

The power supply system in accordance with this invention can be controlled locally by the UT as a function of, by example, the transmitted data rate. This control can be done on a frame-by-frame basis. The control over the power supply system can also be accomplished by commands received from a remote source, such as from a terrestrial gateway via one or more satellites, and/or from a satellite itself. The remote control beneficially allows an extension of on-line time for remotely located unmanned communication units.

This teaching of this invention uses the HEDC to augment or supplant the battery during the transmission of individual packets or groups of packets, or a timed stream of information data. The power source switching and selection system in accordance with this invention allows the capacitor to be switched in or out depending on information derived from, by example, a vocoder that processes speech to be transmitted, and/or according to the overall power required by the user terminal to achieve a certain specified transmitted energy per bit during a frame of packet data (voice or data).

One advantage of this invention is an ability to control the discharge cycle of both the battery and the capacitor independently or in conjunction with various input commands and requirements, and in accordance with pre-set thresholds. The control method can be optimized to take advantage of various operating conditions that the UT may encounter.

This invention teaches in one aspect a method for operating a satellite communications terminal that transmits one of digital voice or data signals during a frame period. The terminal includes at least one transceiver having a transmitter and a receiver, the transmitter including an RF power amplifier. The method includes the steps of: (a) providing the terminal with a hybrid power source comprised of a battery, a high energy density capacitor (HEDC), and a switching circuit coupled to the battery and the HEDC for selectively coupling one or both in parallel to an output of the power source, the output of the power source being coupled at least to the RF power amplifier; (b) storing predetermined threshold values, including at least a data rate threshold value and a transmitter power level threshold value; (c) comparing at least one of a transmission rate to be used during a next frame period to the stored data rate threshold value and a transmission power level to be used during the next frame period to the stored power level threshold value; and (d) responsive to the comparison, controlling the switching circuit so as to select one or both of the battery and HEDC for coupling to the output of the power source.

In a preferred embodiment of this invention the step of storing includes an initial step of receiving at least one of the data rate threshold value and the transmitter power level threshold value from a satellite that is linked to a terrestrial station. The step of storing further includes an initial step of inputting at least one of a mode flag and an on/off flag from a terminal user interface, and storing the inputted flag in a memory. In this case the step of comparing is responsive to the stored flags for selecting whether to connect only the battery, or only the HEDC, or both the battery and the HEDC in parallel to the output of the power source.

BRIEF DESCRIPTION OF THE DRAWINGS

The above set forth and other features of the invention are made more apparent in the ensuing Detailed Description of the Invention when read in conjunction with the attached Drawings, wherein:

FIG. 5A is a simplified equivalent circuit of a plurality of HEDCs connected to a load, while FIG. 5B is a graph showing the charge/discharge state over time of the HEDC;

DETAILED DESCRIPTION OF THE INVENTION

This invention operates a user terminal so as to switch to a large capacitance, such as the HEDC, for periods of time when higher burst power or energy is required. During other times normal battery-powered operation is maintained. The invention is described below in the context of a power supply that supplies power to a final power amplifier of a Dual Mode Satellite Radio Telephone (DMSRT). However, it should be realized that the disclosed methods and apparatus may be used to control the hybrid power use of other types of devices. Also, and although it is preferred to employ a HEDC-type device, it is within the scope of this invention to employ any type of capacitance having a capacity to store sufficient charge to supply the power needs of the terminal. In practice, conventional capacitors having the required charge storing capacity are too large and bulky to be incorporated into a handheld user terminal, although they may be suitable for non-handheld terminal embodiments.

Figure 1A:
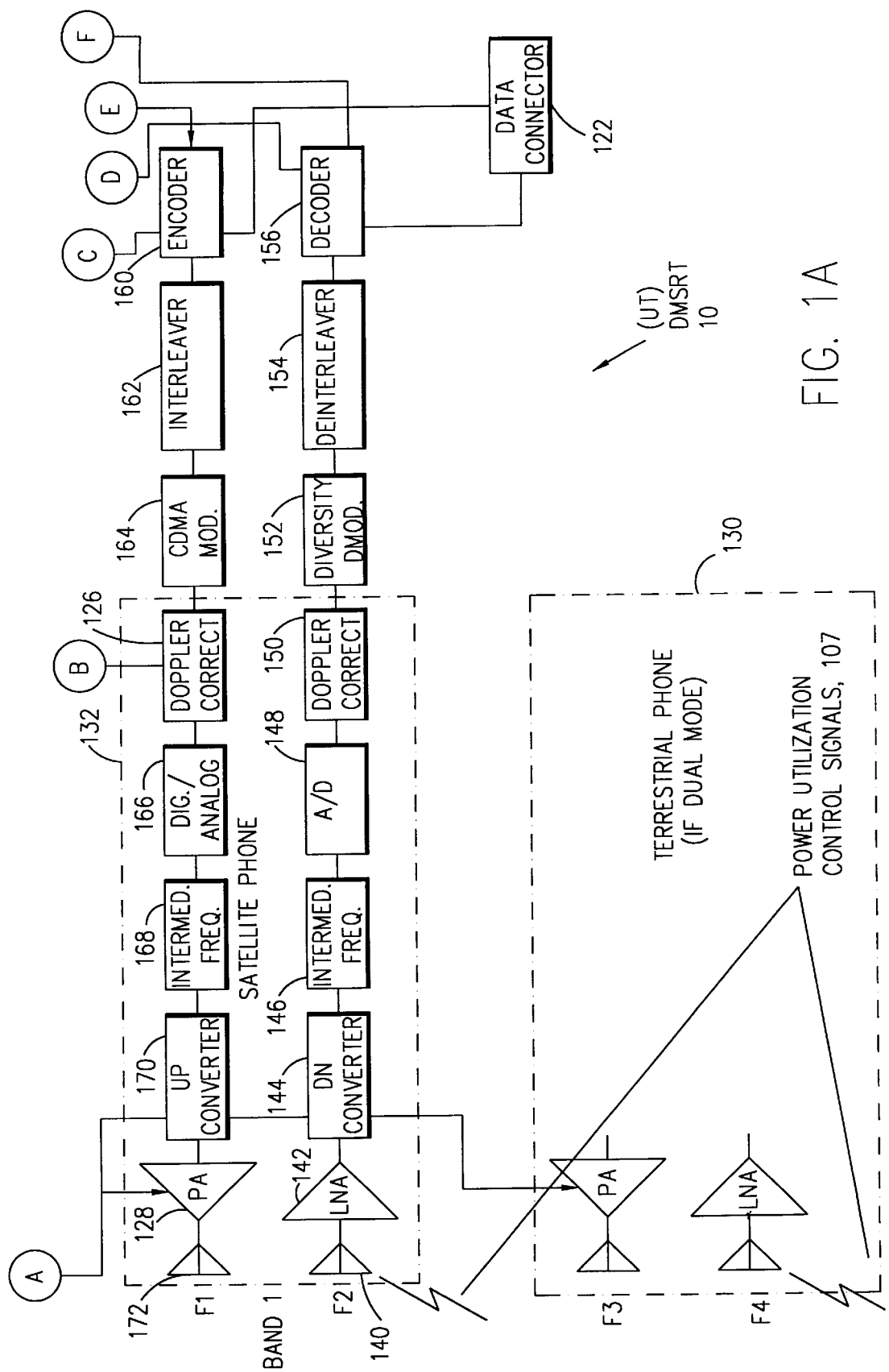
FIGS. 1A and 1B are a block diagram of a satellite user terminal that is constructed and operated in accordance with this invention.
Figure 1B:
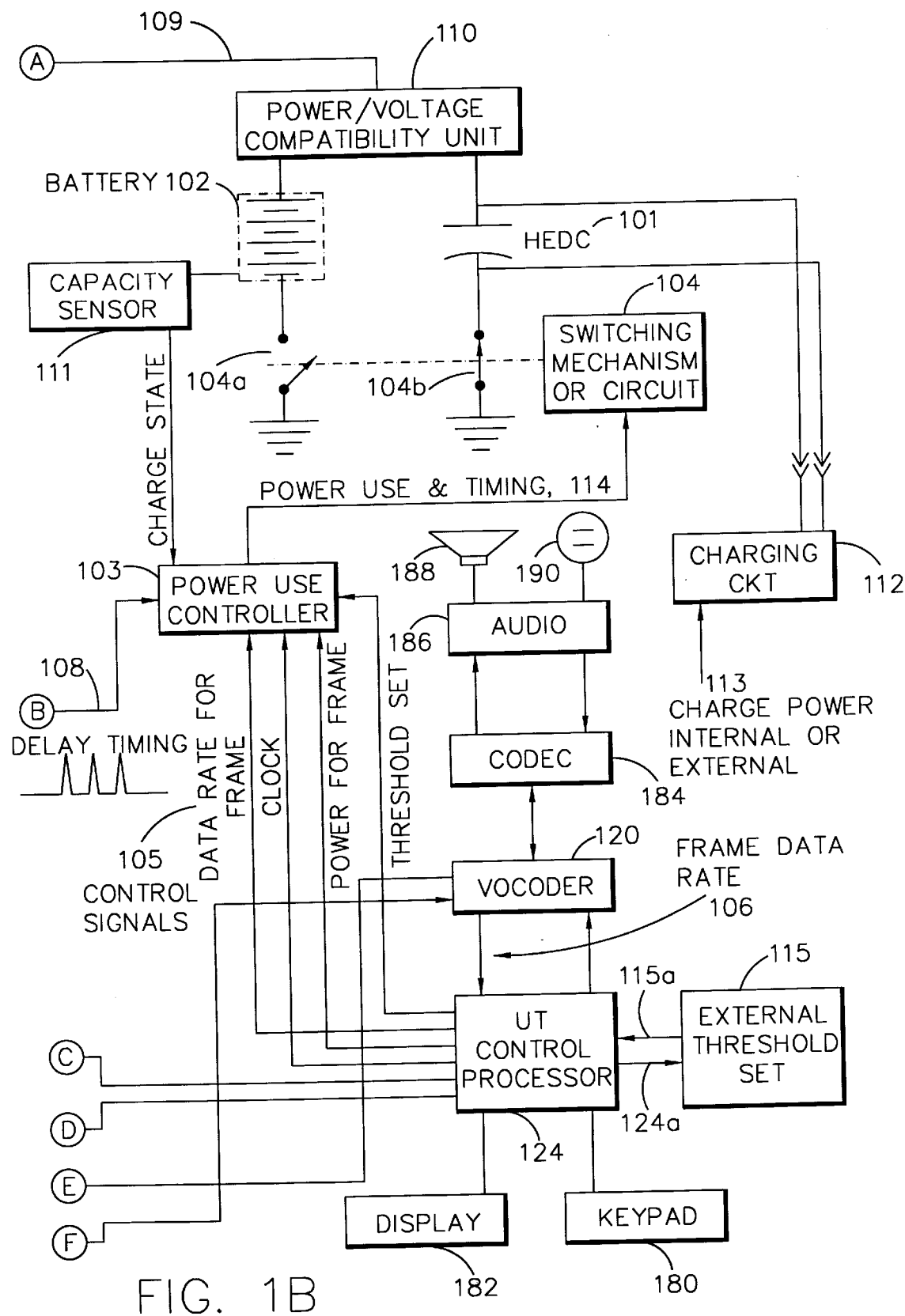

FIGS. 1A and 1B, collectively referred to herein as FIG. 1, illustrate a block diagram of an embodiment of a DMSRT 10. The DMSRT 10 includes a HEDC 101, such as the A-14500 HEDC referred to above, that is used in conjunction with a rechargeable battery 102. The teaching of this invention is not, however, limited for use only with this one particular type of HEDC, and can be practiced with any suitable high capacity current storage device. Battery 102 may or may not be paralleled with the HEDC 101. A switching circuit 104 is used to control the connection state of the battery 102 and the HEDC 101 with switches 104a and 104b so as to insert one while removing the other, or vice versa, or to parallel the two, as controlled by a power use and timing signal 114 output from a power use controller unit 103. The power use controller unit 103 is responsive to control signals 105 output from a control processor 124, which include a data rate for a next frame of data to be sent, a clock pulse for timing control, a required power for a frame to be transmitted, and power threshold setting flags which limit or enable the use of the HEDC 101. The frame rate 106 output from a variable rate vocoder 120 or some other variable rate device (which could be a data input from a data connector 122) informs a control processor 124 of the rate which is used to encode the frame. The data rate for the frame, as part of control signals 105, is relayed to the power user controller 103. Furthermore, for a satellite user terminal wherein large frequency shifts can occur due to relative motion between a non-geosynchronous orbit satellite and the UT, a Doppler corrector block 126 provides a frequency and timing delay correction signal 108 to the power use controller 103 to synchronize the switching of HEDC 101 so as to align the timing for the next, intended frame at a high power amplifier (PA) 128. A power/voltage compatibility unit 110 controls the application of the DC power to the PA 126 from the appropriate source, and provides any voltage conversion, regulation, or stabilization needed for HEDC 101 and/or the battery 102.

An external threshold setting block 115, such as a memory device, stores data rate and power threshold parameters, and various flags, that are passed to the control processor 124 over path 115, which then forwards the thresholds and flags on to the power use controller 103. The processor 124, according to instructions delivered to it either from the keypad 180 or via the link 107, may be used to revise the stored thresholds and/or flags over the path 124a.

A charging circuit 112 provides a means for charging the capacitor or the battery or the combination capacitor/battery. These components can be charged from an external power source 113, or the capacitor 101 can be charged internally from the battery 102. Furthermore, a capacity sensor 111 is connected to the HEDC 101 and battery 102 to determine the relative charging level of each, and to appropriately instruct the power use controller 103 to switch the capacitor in or out, or in parallel, depending on the state of charge of the battery 102 and capacitor 101.

Additionally, remote control of the selection of the battery 102 or the HEDC 101 is provided. This can be accomplished by transmitting predefined power utilization control signals 107 to command the switching mechanism 104. In this case, and for the DMSRT 10, the control signals 107 can be received from one of a terrestrial system through a terrestrial phone block 130, or from a terrestrial gateway 12 (see FIG. 2), or a satellite, through a satellite phone block 132.

Although not specifically forming a portion of this invention, the satellite phone block 132 is constructed to include, in addition to the above-mentioned Doppler correction circuit 126 and the PA 128, a transceiver comprised of a receiver chain and a transmitter chain. For the presently preferred CDMA embodiment of this invention the receiver chain includes a receive antenna 140, a low noise amplifier (LNA) 142, a downconverter 144, an intermediate frequency (IF) block 146, an A/D converter 148, a Doppler corrector 150, a diversity combiner/demodulator (e.g. a Rake receiver) 152, a deinterleaver 154, and a decoder 156. The transmit chain is essentially the reverse of the receiver chain, and includes an encoder 160, interleaver 162, CDMA modulator 164, the before-mentioned Doppler corrector 126, a D/A converter 166, intermediate frequency block 168, upconverter 170, the PA 128, and a transmit antenna 172. The transmit and receive chains operate at frequencies F1 and F2, respectively.

The UT 10, especially in a hand-held embodiment, may also includes a keypad 180, a display 182, a codec 184 connected to the vocoder 120, and suitable audio circuits 186 connected to a speaker 188 and a microphone 190. The construction and operation of these components can be conventional in nature.

The construction of the terrestrial phone 130 can be similar to that of the satellite phone block, but will typically operate in different frequency bands.

In a presently preferred, but not limiting, embodiment of this invention there are a total of 48 satellites in, by example, a 1400 km Low Earth Orbit (LEO). The satellites are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway 12 coverage area to or from other points on the earth's surface by way of the public switched telephone network (PSTN 14 or PLMN 16, see FIG. 2), via one or more gateways 12 and one or more of the satellites.

A presently preferred spread spectrum (SS) CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed.

Figure 7:
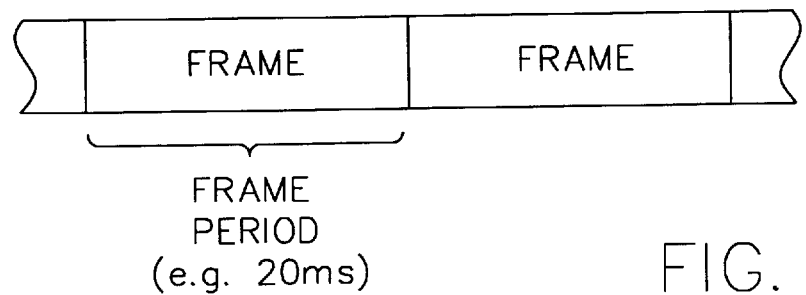
FIG. 7 illustrates an exemplary frame structure on the forward link between the user terminal and a gateway, that is transmitted via at least one satellite.

FIG. 7 illustrates an exemplary frame structure on the forward link between the user terminal 10 and the gateway 12, that is transmitted via at least one satellite. In the presently preferred CDMA embodiment the frames are transmitted continuously during speech, and each frame may be transmitted with a different data rate and/or power level.

The low earth orbits permit the DMSRT 10 to communicate via the satellites, each of which functions, in a presently preferred embodiment of this invention, solely as a "bent pipe" repeater to receive a communications traffic signal (such as speech and/or data) from a user terminal or from a gateway 12, convert the received communications traffic signal to another frequency band, and to then re-transmit the converted signal. However, satellites that perform on-board signal processing can also be used, as can satellites having intersatellite crosslinks.

Each user terminal, such as the DMSRT or simply UT 10, may be capable of operating in a full duplex mode and can communicate via, by example, L-band RF links (uplink or return link at frequency F1) and S-band RF links (downlink or forward link at frequency F2) through return and forward satellite transponders, respectively. The return L band RF links may operate within a frequency range (F1) of 1.61 GHz to 1.625 GHz, a bandwidth of 16.5 MHz, and are modulated with packetized digital voice signals and/or data signals in accordance with the preferred spread spectrum technique. The forward S band RF links may operate within a frequency range (F2) of 2.485 GHz to 2.5 GHz, a bandwidth of 16.5 MHz. The forward RF links are modulated at the gateway 12 with packetized digital voice signals and/or data signals in accordance with the spread spectrum technique.

The following U.S. Patents teach various aspects of a LEO satellite constellation, and the associated communication system, which may be used to practice this invention in conjunction with the DMSRT 10 of FIG. 1: U.S. Pat. No. 5,422,647, issued Jun. 6, 1995, entitled "Mobile Communication Satellite Payload", by E. Hirshfield and C. A. Tsao;

U.S. Pat. No. 5,504,493, issued Apr. 2, 1996, entitled "Active Transmit Phased Array Antenna with Amplitude Taper", by E. Hirshfield; U.S. Pat. No. 5,448,623, issued Sep. 5, 1995, and U.S. Pat. No. 5,526,404, issued Jun. 11, 1996, "Satellite Telecommunications System Using Network Coordinating Gateways Operative with a Terrestrial Communication System", by R. A. Wiedeman and P. A. Monte; U.S. Pat. No. 5,233,626, issued Aug. 3, 1993, entitled "Repeater Diversity Spread Spectrum Communication System", by S. A. Ames; and U.S. Pat. No. 5,552,798, issued Sep. 3, 1996, entitled "Antenna for Multipath Satellite Communication Links", by F. J. Dietrich and P. A. Monte. The disclosures of these various U.S. Patents are incorporated by reference herein in their entireties.

Figure 2:
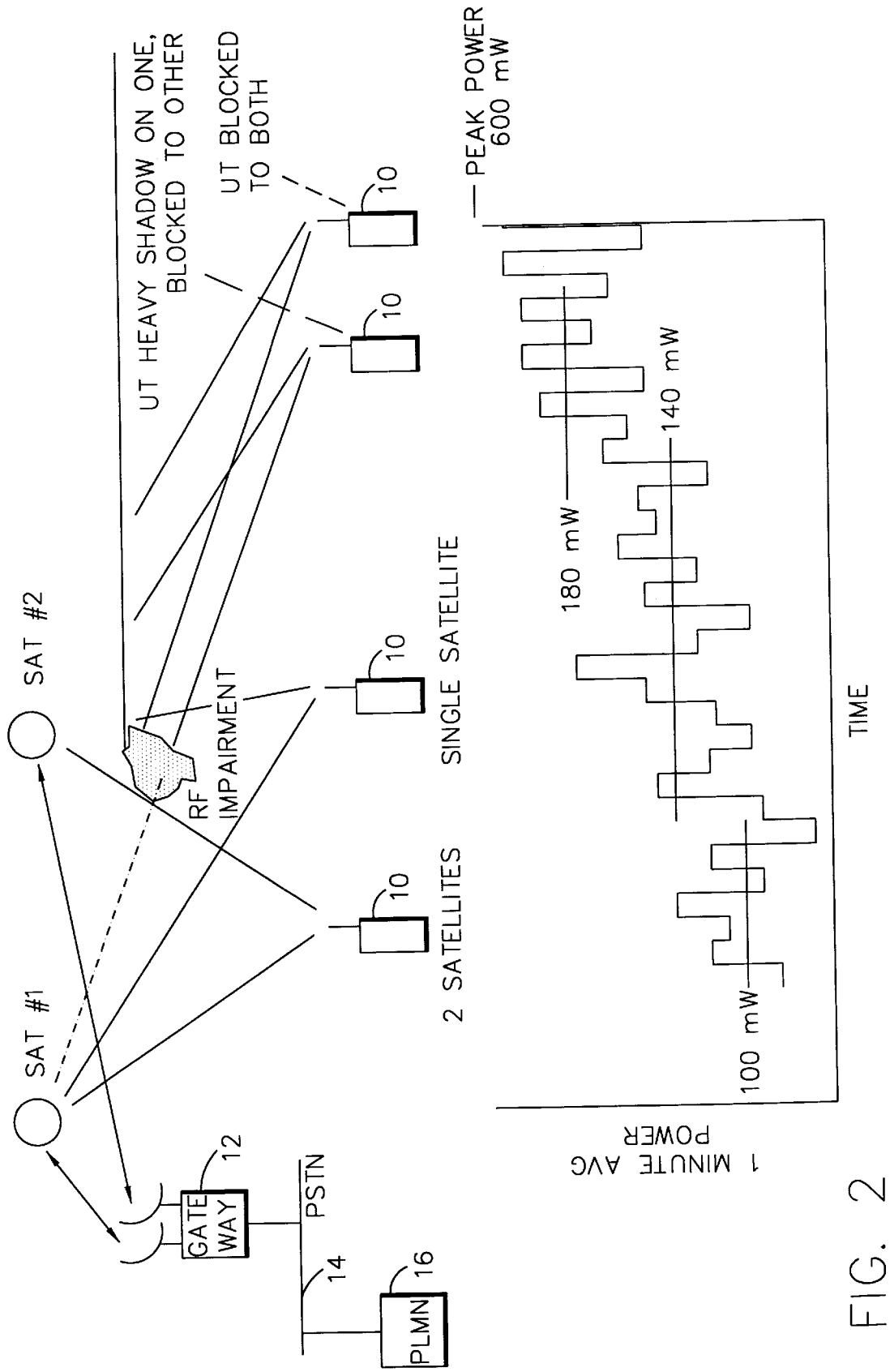
FIG. 2 illustrates an average required power over time for various user terminal locations relative to one or more satellites.

FIG. 2 illustrates various example cases for UT 10 operation. When the UT 10 is in view of two satellites (SAT#1, SAT#2), the power required (averaged over one minute) is about 100 mW. When the UT 10 is using only one satellite, for example when the other satellite is blocked, the average power level is about 140 mW to 160 mW. For the case of a heavily shadowed UT to one satellite, and complete blockage with respect to the other satellite, the average power level can be as high as approximately 300 mW. Under a completely blocked condition the UT 10 may require as much as 600 mW of peak power for some prescribed period of time. The RF impairment illustrated in FIG. 2 may be foliage, a rain cell, or any RF attenuator in the transmit frequency band of interest (e.g., the L band frequencies of 1.61 GHz to 1.625 GHz).

Figure 3:
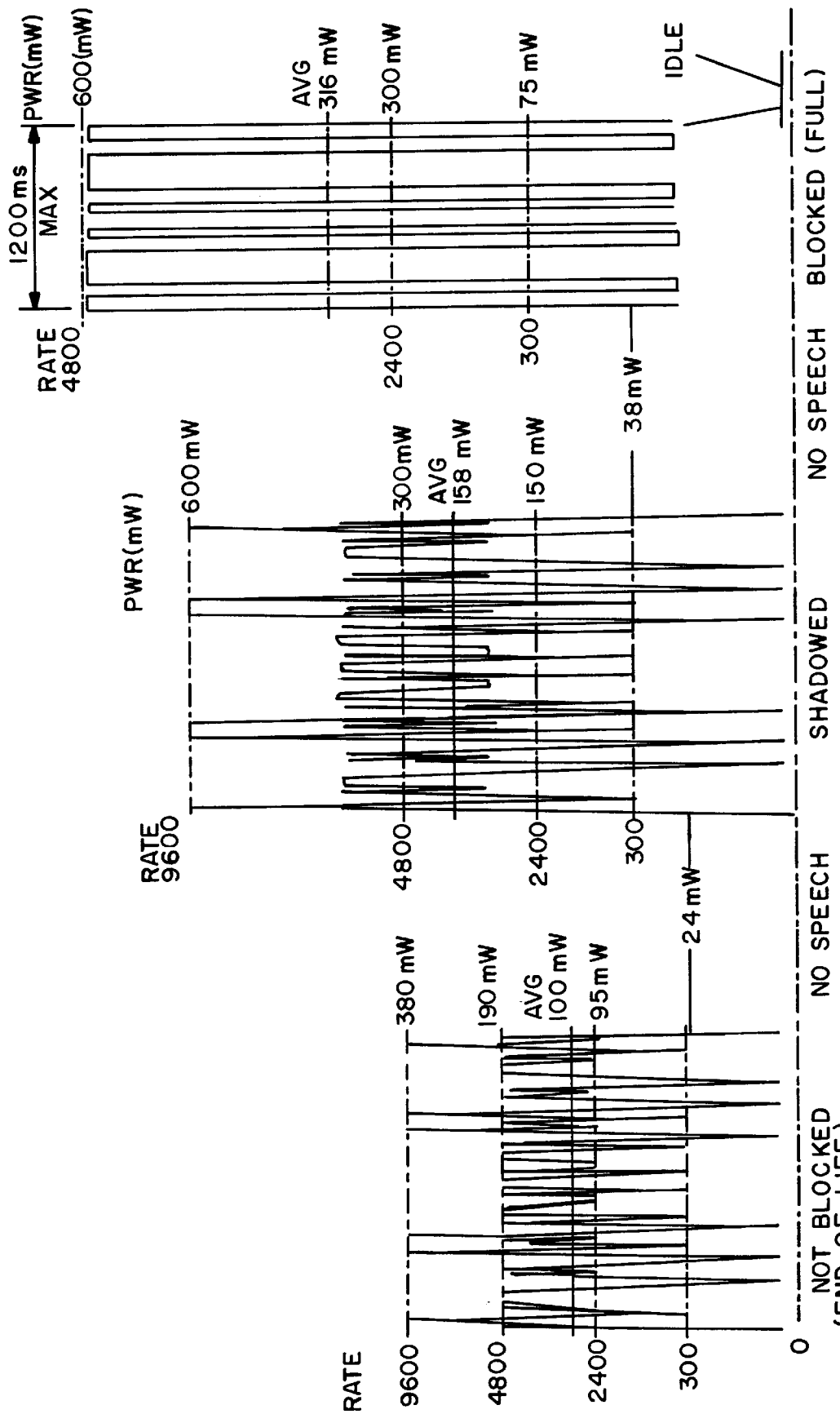
FIG. 3 is a graph that illustrates the required power over time for various user terminal data rates and locations relative to one or more satellites.

FIG. 3 depicts the UT 10 transmitter power as it is controlled by a power control function so as to minimize the UT transmitted power, while also equalizing all UT transmissions due to near/far situations. The power is automatically varied depending on the rate of the vocoder 120, wherein usually 10% of the time (i.e., during operation at 9600 bps) this power is at a peak of about 600 mW. As is shown, the power level depends on the degree of shadowing. For the unblocked case, the peak power needed is about 380 mW, and for partially shadowed is 600 mW. For the worst case blocking, since power cannot be increased further, the data rate is reduced and data is transmitted at a rate of 4800 bps. Other data rates (such as 2400 and 300 bps), which depend on the speech characteristics, require different transmitter power levels as shown in the diagram.

Figure 4:
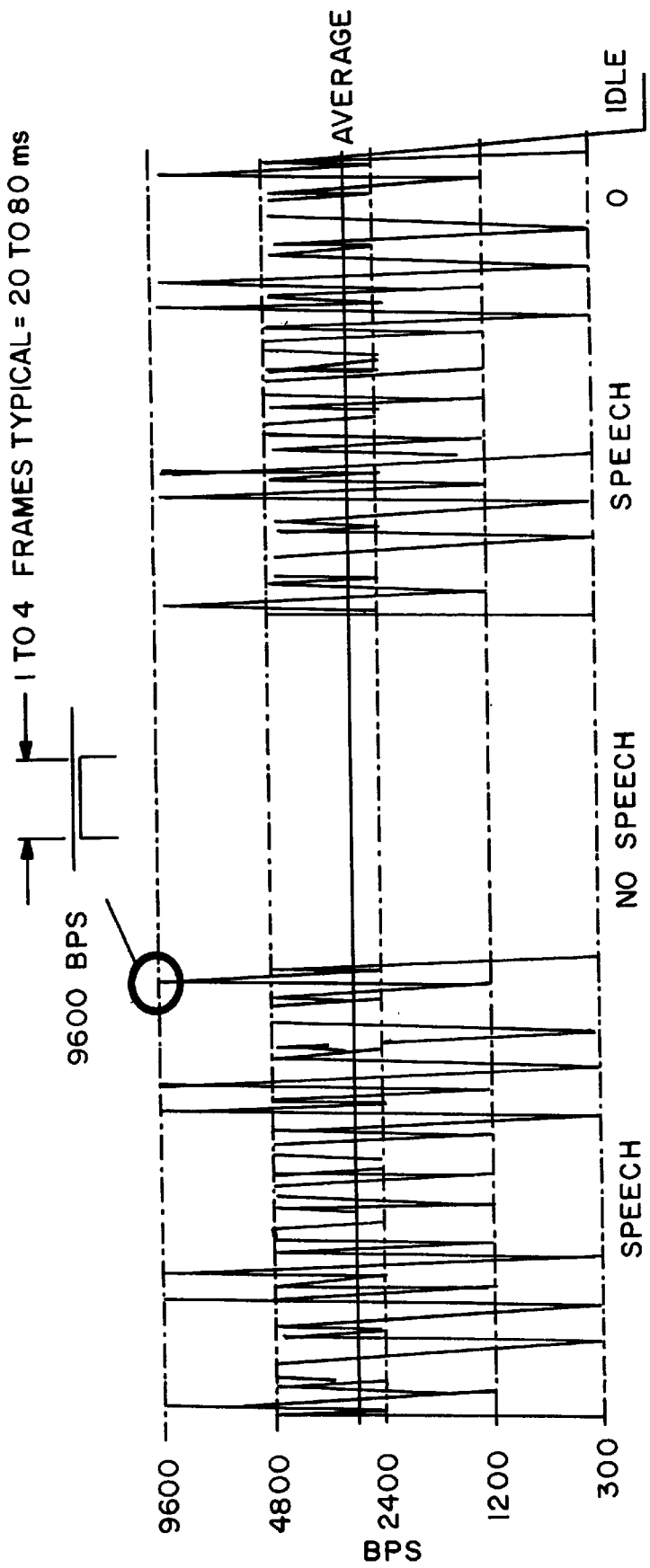
FIG. 4 is a graph that illustrates the required power over time for various user terminal data rates during speech frames, during no speech frames, and during idle frames.

FIG. 4 illustrates the return link operation of the UT 10 with speech provided by the digital packetized variable rate vocoder 120. The variable rate vocoder 120 can develop a data rate range of 300 to 9600 bps, with an average rate of about 2800 bps (see the following Table 1). Other rate quantizations are possible, with the illustrated rate set being exemplary. The power required to transmit the lower rate frames can be adjusted to conserve power. The peak power is required for the peak rate of 9600 bps which is generated by vocoder 120. The peak rate is normally needed to transmit voice at the beginning of words or to emphasize certain syllables. Since the UT 10 transmits frames of 20 ms duration, the rate and power can be varied frame by frame. For this reason the delay timing 108 and frame data rate and power for each frame is required by power use controller 103 to allow the switching mechanism 104 to determine the correct operation of the HEDC/battery combination.

TABLE 1

| UT OPERATION | | |
|---|---|---|
| | During Total Call | During Speech |
| 9600 | 10% | 20% |
| 4800 | 20% | 40% |
| 2400 | 10% | 20% |
| 300 | 60% | 20% |
| idle | 0% | 0% |

FIG. 5 illustrates an equivalent circuit of a plurality of parallel connected HEDCs 101, while FIG. 5B illustrates a typical capacitor charge/discharge use diagram. The charging curve is a function of the combined resistance of the HEDC 101 ESR resistance and the charging circuit 112 terminal impedance. The discharge curve is a function of the combination of the HEDC 101 ESR and the equivalent load impedance of the UT 101 as seen from the terminals of the HEDC 101. The ideal situation is to provide a HEDC 101 with a very fast charge curve and a very slow discharge curve, as shown in FIG. 5B, and to periodically charge the HEDC 101 externally or internally, either separately or in combination with the charging of the battery 102.

Figure 8:
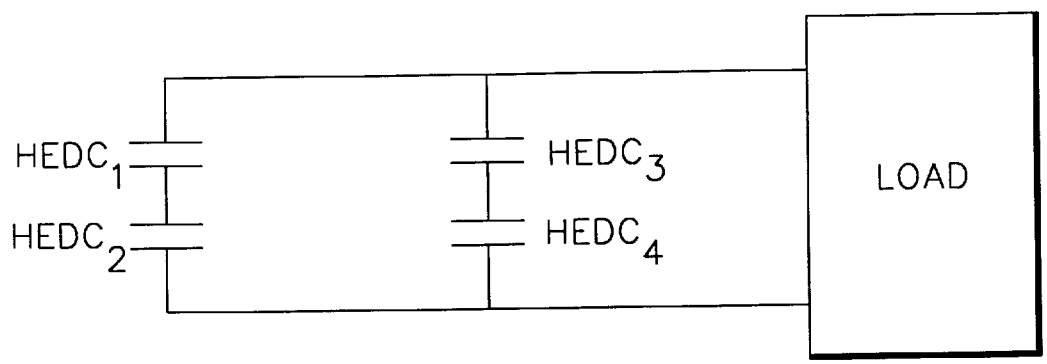
FIG. 8 illustrates the use of a plurality of HEDCs in a series/parallel configuration.
Figure 9:
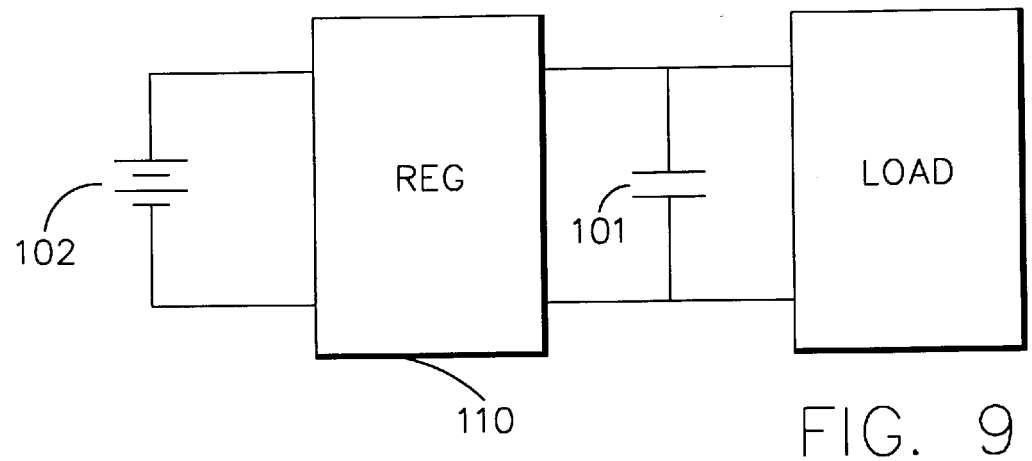
FIG. 9 illustrates the use of the HEDC at an output of a voltage regulator.

The teaching of this invention is thus not limited for use with but one HEDC 101, as two or more may be operated in parallel. Referring also to FIG. 8, it is within the scope of the teaching of this invention to also place two or more HEDCs in series, and to also parallel two or more series connected HEDCs.

Figure 6A:
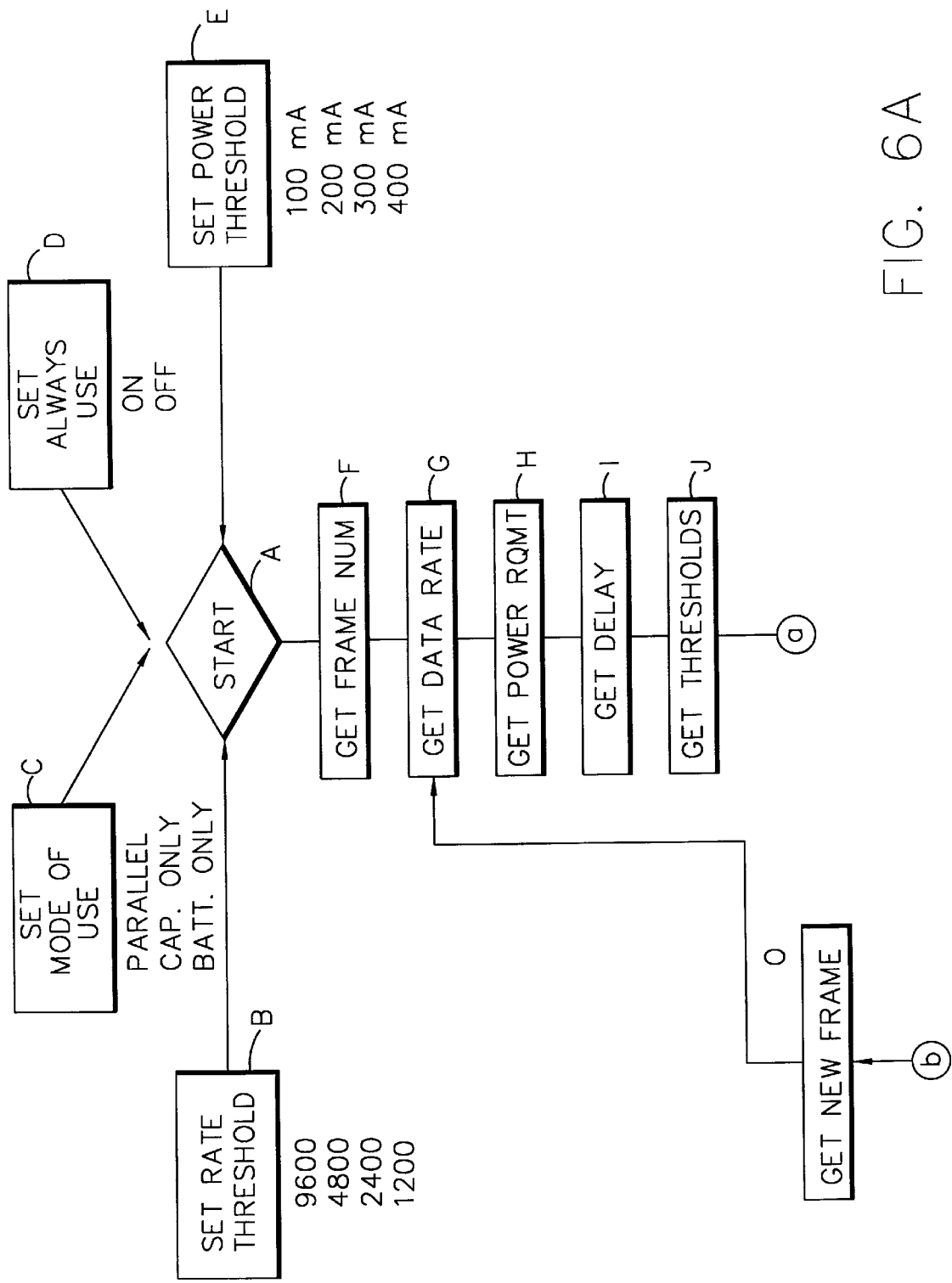
FIGS. 6A and 6B are a logic flow diagram that illustrates a control method in accordance with this invention.
Figure 6B:
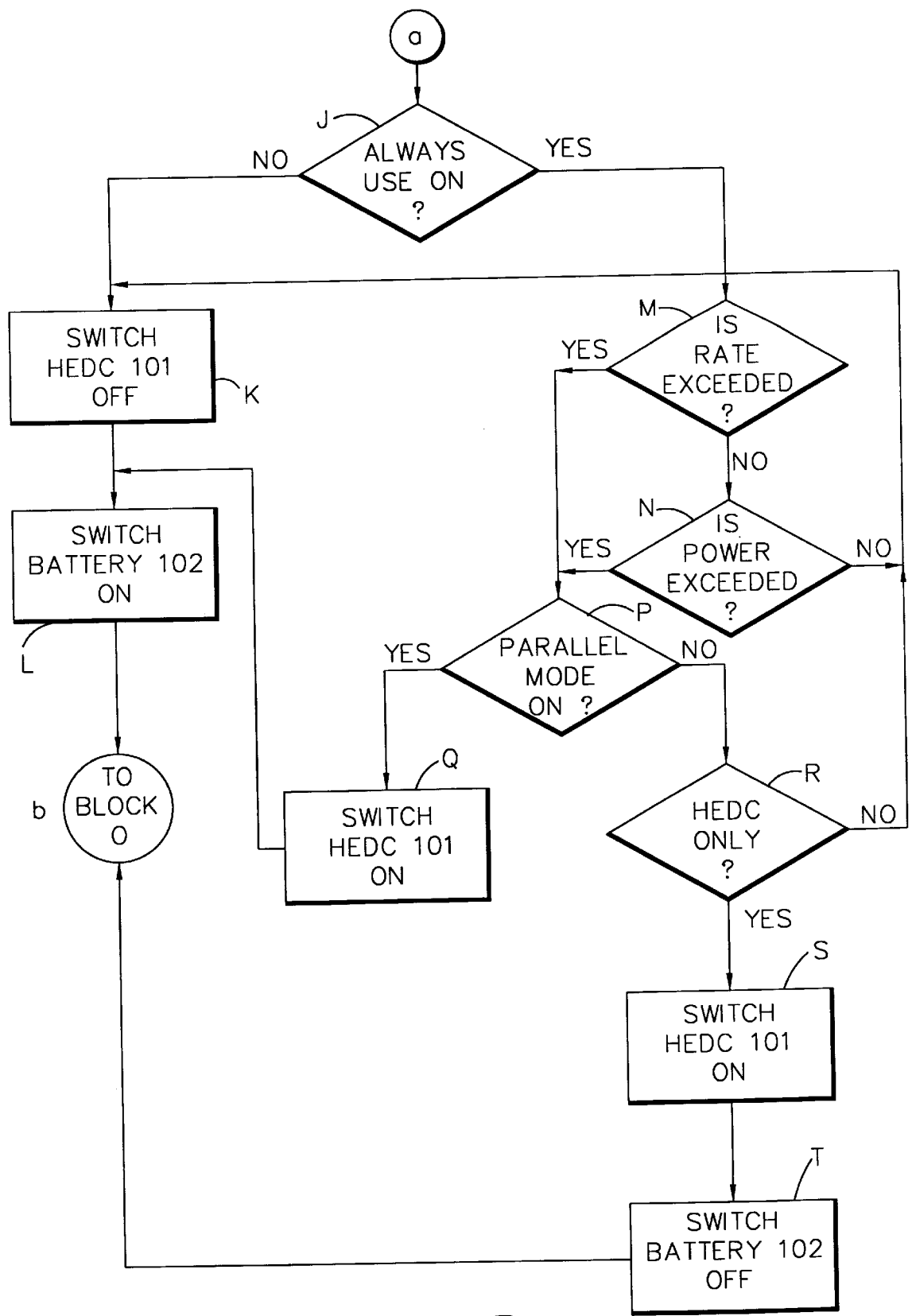

FIGS. 6A and 6B are an exemplary logic flow diagram showing a process of selecting one of the battery 102, HEDC 101, or both, on a frame-by-frame basis. This method is executed by the UT control processor 124, in combination with the power use controller 103.

At Block A the method starts. It is assumed that previously the threshold settings block 115 has been preloaded with a number of thresholds of interest, such as a data rate threshold at which to use the HEDC 101 (Block B); a mode threshold, i.e., battery 102 only, HEDC 101 only, or battery/HEDC parallel (Block C); an on/off threshold (Block D); and a power threshold at which to use the HEDC 101 (Block E). One or more of these various thresholds and flags can pre-stored (i.e., hardwired) in the UT 10, or can entered by the user through, by example, the keypad 180 in cooperation with the display 182, or can be entered over the air from the gateway 12 and/or satellite.

In Block A these various thresholds and flags are passed to the power use controller 103 from the control processor 124. At Blocks F–J the power use controller 103 gets the next frame number, the data rate for the next frame, the required power, the delay 108 from Doppler corrector 126, and the thresholds from the control processor 124.

At Block J a comparison is made to determine if the 'always use' flag is On. If No, control passes to Block K to switch off the HEDC 101, and then to Block L to switch on the battery 102 (if not already on). Control then passes to Block O to begin processing the next frame.

If the 'always use' flag is determined to be On at Block J, control instead passes to Block M to determine if the data rate for the next frame equals or exceeds the rate threshold (Block B). If No, control passes to Block N to determine to determine if the required transmit power for the next frame is equal to or exceeds the power threshold (Block E). If neither the rate or power thresholds are exceeded control passes to Block K to switch off the HEDC 101 (if on), and then to Block L to switch on the battery 102 (if off), and then to Block O to begin processing the next frame. This operation causes the next frame to be transmitted at the current power level set by the UT closed loop and open loop power control system, using the power from the battery 102 only.

If the result of the comparison at either Blocks M or N is Yes (i.e., either the data rate or power is equal to or exceeds the associated threshold value), control passes to Block P to determine if the parallel mode flag is On. If Yes, control passes to Block Q to switch on the HEDC 101, then to Block L to switch on the battery 102, then to Block O. If No at Block P, control passes to Block R to determine if the HEDC only flag is On. If No, control passes to Block K to switch off the HEDC 101. If Yes at Block R, control instead passes to Block S to switch the HEDC 101 on, and then to Block T to switch off the battery 102. Control then passes to Block O to process the next frame.

The end result is the frame-by-frame control of the power supply source for the RF power amplifier 128 as a function of a number of variables, including the frame data rate, the required frame power level, and several hardwired, user-inputted and/or gateway-inputted control flags or criteria. The actual switching of the HEDC 101 and/or battery 102 is timed in accordance with the delay timing signal 108 so that the power amplifier 128 has sufficient time to reach full power and stabilize before the frame of data is output from the vocoder 120 to the encoder 160.

It can be appreciated that the decision of Block J (i.e., is the 'always use' flag set) is optional. For example, if it is assumed that the 'always use' flag is always set, then the overall time to execute the method is reduced.

It should be realized that the use of this invention need not operate to increase the transmitted power, as the UT 10 is constrained to transmit at prescribed power levels in accordance with closed loop power control commands received from the gateway 12. These power control commands may be received at the frame rate or some multiple of the frame rate. Instead, the use of this invention either supplants or supplements the use of the battery 102 with the HEDC 101, thereby acting to reduce overall battery power consumption.

This invention has been described in the context of presently preferred embodiments. However, the teachings of this invention should not be construed so as to be limited to only these embodiments. By example, the UT 10 may be a satellite-only terminal, and need not have dual-mode capability. Also, TDMA satellite user terminals can also benefit from the teaching of this invention, wherein transmissions are made in one or more assigned time slots on a per frame basis. Also, certain of the steps illustrated in FIGS. 6A and 6B could be executed in other than the order shown, while still achieving the same result. Furthermore, it is within the scope of this invention to connect more than the power amplifier(s) to the outputs of the HEDC 101 and battery 102. In general, the benefits that flow from the use of this invention will be more pronounced when the highest current consuming devices are powered from the HEDC/battery combination. Low power components, such as the display 182, can be powered only from the battery 102. It is also within the scope of this invention to employ one or mode HEDCs at the output of the regulator. This configuration provides the battery 102 with overall lower resistance.

Thus, while the invention has been particularly shown and described with respect to preferred embodiments thereof, it will be understood by those skilled in the art that changes in form and details may be made therein without departing from the scope and spirit of the invention.

What is claimed is:

1. A communications terminal that periodically transmits information during transmission periods, comprising:
    a transmitter;
    a power source comprised of a battery and a capacitor;
    a switching circuit coupled to said battery and said capacitor for selectively coupling one of (a) the battery alone, (b) the capacitor alone, and (c) both together in parallel to an output of said power source, said output of said power source being coupled at least to said transmitter; and
    a controller, responsive to a transmission rate to be used during a next transmission period, for controlling said switching circuit so as to select either one or both together in parallel of said battery and capacitor for coupling to said output of said power source.

2. A communications terminal that periodically transmits information during transmission periods, comprising:
    a transmitter;
    a power source comprised of a battery and a capacitor;
    a switching circuit coupled to said battery and said capacitor for selectively coupling one of (a) the battery alone, (b) the capacitor alone, and (c) both together in parallel to an output of said power source, said output of said power source being coupled at least to said transmitter; and
    a controller, responsive to a transmitter power level to be used during a next transmission period, for controlling said switching circuit so as to select either one or both together in parallel of said battery and capacitor for coupling to said output of said power source.

3. A communications terminal that transmits one of digital voice or data signals during a transmission period, comprising:
    a transmitter;
    a power source comprised of a battery and a high energy density capacitor (HEDC);
    a switching circuit coupled to said battery and said HEDC for selectively coupling one of (a) the battery alone, (b) the HEDC alone, and (c) both together in parallel to an output of said power source, said output of said power source being coupled at least to said transmitter;
    a memory for storing predetermined threshold values, including at least a data rate threshold value and a transmitter power level threshold value;
    a processor coupled to said memory, said processor comprising means for comparing a transmission rate to be used during a next transmission period to said data rate threshold value and for comparing a transmission power level to be used during said next transmission period to said power level threshold value, said processor being responsive to said comparing means for controlling said switching circuit so as to select one of (a) the battery alone, (b) the HEDC alone, and (c) both together in parallel for coupling to said output of said power source.

4. A satellite communications terminal that transmits one of digital voice or data signals during a frame period, comprising:
    a transceiver comprising a transmitter and a receiver, said transmitter including an RF power amplifier;
    a power source comprised of a battery and a high energy density capacitor (HEDC);
    a switching circuit coupled to said battery and said HEDC for selectively coupling one of (a) the battery alone, (b)

the HEDC alone, and (c) both together in parallel to an output of said power source, said output of said power source being coupled at least to said RF power amplifier;

a memory for storing predetermined threshold values, including at least a data rate threshold value and a transmitter power level threshold value; and a controller coupled to said memory, said controller comprising means for comparing a transmission rate to be used during a next frame period to said data rate threshold value and for comparing a transmission power level to be used during said next frame period to said power level threshold value, said controller being responsive to said comparing means for controlling said switching circuit so as to select one of (a) the battery alone, (b) the HEDC alone, and (c) both together in parallel for coupling to said output of said power source.

5. A satellite communications terminal as set forth in claim 4, wherein said controller is further comprised of means, coupled to said receiver, for receiving at least one of said data rate threshold value and said transmitter power level threshold value, and for storing said received value in said memory.

6. A satellite communications terminal as set forth in claim 4, wherein said memory further stores a mode flag and an on/off flag, and wherein said comparing means is responsive to said flags for selecting whether to connect only said battery, or only said HEDC, or both said battery and said HEDC in parallel to said output of said power source.

7. A method for operating a satellite communications terminal that transmits one of digital voice or data signals during a frame period, the terminal including a transceiver comprising a transmitter and a receiver, the transmitter including an RF power amplifier, comprising steps of:

providing the terminal with a power source comprised of a battery, a high energy density capacitor (HEDC), and a switching circuit coupled to the battery and the HEDC for selectively coupling one of (a) the battery alone, (b) the HEDC alone, and (c) both together in parallel to an output of the power source, the output of the power source being coupled at least to the RF power amplifier;

storing predetermined threshold values, including at least a data rate threshold value and a transmitter power level threshold value;

comparing at least one of a transmission rate to be used during a next frame period to the stored data rate threshold value and a transmission power level to be used during the next frame period to the stored power level threshold value; and responsive to the comparison, controlling the switching circuit so as to select one of (a) the battery alone, (b) the HEDC alone, and (c) both together in parallel for coupling to the output of the power source.

8. A method as set forth in claim 7, wherein the step of storing includes an initial step of receiving at least one of the data rate threshold value and the transmitter power level threshold value from a satellite that is linked to a terrestrial station.

9. A method as set forth in claim 7, wherein the step of storing includes an initial step of inputting at least one of a mode flag and an on/off flag from a terminal user interface, and storing the inputted flag in the memory.

10. A method as set forth in claim 9, wherein the step of comparing is responsive to the stored flags for selecting whether to connect only the battery, or only the HEDC, or both the battery and the HEDC in parallel to the output of the power source.

* * * * *